United States Patent
Zheng et al.

(10) Patent No.: US 9,798,932 B2
(45) Date of Patent: Oct. 24, 2017

(54) VIDEO EXTRACTION METHOD AND DEVICE

(71) Applicant: Huawei Technologies Co., Ltd., Shenzhen (CN)

(72) Inventors: Chen Zheng, Shenzhen (CN); Yang Liu, Shenzhen (CN); Dong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/068,017

(22) Filed: Mar. 11, 2016

(65) Prior Publication Data

US 2016/0196473 A1    Jul. 7, 2016

Related U.S. Application Data

(63) Continuation of application No. PCT/CN2014/075406, filed on Apr. 15, 2014.

(30) Foreign Application Priority Data

Oct. 16, 2013  (CN) .......................... 2013 1 0485348

(51) Int. Cl.
*G06K 9/00* (2006.01)
*G06T 7/20* (2017.01)
*G06K 9/46* (2006.01)

(52) U.S. Cl.
CPC ..... *G06K 9/00744* (2013.01); *G06K 9/00771* (2013.01); *G06K 9/4604* (2013.01);
(Continued)

(58) Field of Classification Search
CPC ............. G06K 9/00744; G06K 9/4604; G06K 9/00771; G06K 9/00; G06K 9/46; G06T 7/20
(Continued)

(56) References Cited

U.S. PATENT DOCUMENTS

2005/0128307 A1  6/2005  Kobayashi et al.
2006/0181644 A1  8/2006  De Haan
(Continued)

FOREIGN PATENT DOCUMENTS

CN     1771515 A     5/2006
CN   102006477 A     4/2011
(Continued)

OTHER PUBLICATIONS

Lowe, "Distinctive Image Features from Scale-Invariant Keypoints", Intl. J. of computer vision, 2004.*
Partial English Translation and Abstract of Chinese Patent Application No. CN102222104, Dec. 26, 2012, 11 pages.
Partial English Translation and Abstract of Chinese Patent Application No. CN102930061, Feb. 13, 2013, 9 pages.
(Continued)

*Primary Examiner* — Ruiping Li
(74) *Attorney, Agent, or Firm* — Conley Rose, P.C.

(57) ABSTRACT

A video extraction method and device. The method includes acquiring original image resolution $S_0$ of a $T^{th}$ frame in which a target image corresponding to a target object is located, where T is a positive integer, and acquiring a resolution parameter P of the target image in the $T^{th}$ frame, obtaining extraction resolution $S_1$ according to the original image resolution $S_0$ and the resolution parameter P, and extracting an image of the target object in a $(T+1)^{th}$ frame according to the extraction resolution $S_1$. In this way, when extraction processing is performed on the target object in the $(T+1)^{th}$ frame, extraction processing is performed on the target image corresponding to the target object in the $(T+1)^{th}$ frame with reference to the extraction resolution, which is obtained through analysis, of the $(T+1)^{th}$ frame.

17 Claims, 2 Drawing Sheets

(52) U.S. Cl.
CPC ...... *G06T 7/20* (2013.01); *G06T 2207/10016* (2013.01); *G06T 2207/30232* (2013.01)

(58) Field of Classification Search
USPC ........................................................ 382/195
See application file for complete search history.

(56) References Cited

U.S. PATENT DOCUMENTS

| | | | |
|---|---|---|---|
| 2007/0127775 | A1 | 6/2007 | Moon et al. |
| 2008/0199044 | A1* | 8/2008 | Tsurumi ................ G06T 7/269 382/103 |
| 2009/0141940 | A1 | 6/2009 | Zhao et al. |

FOREIGN PATENT DOCUMENTS

| | | |
|---|---|---|
| CN | 102222104 A | 10/2011 |
| CN | 102930061 A | 2/2013 |

OTHER PUBLICATIONS

Partial English Translation and Abstract of Chinese Patent Application No. CN102006477, Mar. 15, 2016, 3 pages.
Foreign Communication From A Counterpart Application, PCT Application No. PCT/CN2014/075406, English Translation of International Search Report dated Jul. 25, 2014, 2 pages.
Foreign Communication From A Counterpart Application, PCT Application No. PCT/CN2014/075406, English Translation of Written Opinion dated Jul. 25, 2014, 9 pages.
Qing, L., et al., "Algorithm of Target Tracking based on Mean Shift with Adaptive Tracking Window," Systems Engineering and Electronics, vol. 34, No. 2, Feb. 2012, 4 pages.
English Translation of Qing, L., et al., "Algorithm of Target Tracking based on Mean Shift with Adaptive Tracking Window," Systems Engineering and Electronics, vol. 34, No. 2, Feb. 2012, 12 pages.
Foreign Communication From A Counterpart Application, Chinese Application No. 201310485348.X, Chinese Office Action dated Jan. 25, 2017, 8 pages.

* cited by examiner

VIDEO EXTRACTION METHOD AND DEVICE

CROSS-REFERENCE TO RELATED APPLICATIONS

This application is a continuation of International Application No. PCT/CN2014/075406, filed on Apr. 15, 2014, which claims priority to Chinese Patent Application No. 201310485348.X, filed on Oct. 16, 2013, both of which are hereby incorporated by reference in their entireties.

TECHNICAL FIELD

The present application relates to the field of image processing technologies, and in particular, to a method and a device for extracting an image from a video.

BACKGROUND

In the social public security area, a video surveillance system becomes an important part in maintaining public security and strengthening social management. Although the surveillance system has been widely applied in public places such as a bank, a shopping mall, a station, and an intersection, an actual surveillance task still requires relatively much manual support. In addition, an existing video surveillance system usually only records a video. When information is provided, a video image on which extraction has not been performed can only be used for post-event evidence collection, and the real-time quality and initiative of surveillance are not fully exploited. In view of characteristics of a surveillance video such as a large volume of stored data and long storage time, a conventional method for finding a lead and acquiring evidence from a video needs to consume a lot of manpower, material resources, and time, and efficiency is extremely low. Therefore, in the video surveillance system, a playing time of a video event is shortened by means of video extraction, and a retrieval object may be located through fast browsing by means of target classification screening, thereby greatly improving surveillance efficiency.

Currently, there are two manners for performing extraction on a video file. Specific technical solutions are as follows.

A first solution is reading a video file from a local disk, and then performing moving-object detection on the read video file frame by frame using a frame difference method, to obtain a rectangular outline of a moving object, performing precise tracking on the rectangular outline of the detected moving object by means of rectangular outline matching, using an entire motion process of the tracked moving object as a video abstract, and recording detailed information about each video abstract, and finally, after recording of the entire video abstract is completed, extracting each recorded video abstract from the source video file, and combining all video abstracts into a new video, to obtain a video file including all the video abstracts.

A second solution is performing moving-target detection and analysis processing on an original image sequence, to obtain visual feature information of a moving target in each frame of an original video, performing target tracking combination processing between frames; extracting index information of moving targets in the original video, performing time and space resequencing on moving target objects, generating an abstract video by fusing the moving targets and a background image, recording the index information of the moving targets in the abstract video, and establishing an index association between a moving target in each frame of the abstract video and the moving target in the original video. The object tracking combining method in this solution is simple and effective, and implements fast and accurate extraction of an abstract of a video, and an original video clip in which a moving target shows up can be browsed any time using index information.

However, the foregoing two methods for extracting an image from a video use single resolution to perform image extraction, and therefore an extraction speed is decreased and precision and stability of image extraction are reduced.

SUMMARY

Embodiments of the present disclosure provide a video extraction method and device, to resolve a problem in the prior art that using single resolution to extract an image from a video reduces an extraction speed, precision, and stability of image extraction.

Specific technical solutions are as follows.

A first aspect of the embodiments of the present disclosure provides a method for extracting an image from a video, including acquiring a target image corresponding to a target object in the $T^{th}$ frame, and acquiring original image resolution $S_0$ of the $T^{th}$ frame, where T is a positive integer, determining a resolution parameter P of the target image, obtaining extraction resolution $S_1$ according to the original image resolution $S_0$ and the resolution parameter P, and extracting an image of the target object in the $(T+1)^{th}$ frame according to the extraction resolution $S_1$.

With reference to the first aspect, in a first possible implementation manner, the determining a resolution parameter P of the target image includes acquiring a quantity $S_i$ of pixels included in the target image, when image processing is performed on the $T^{th}$ frame, acquiring a quantity of pixels included in an image corresponding to the target object after each of N times of image processing, and determining a minimum pixel quantity $S_{min}$ among all pixel quantities, where N is a positive integer, and determining the resolution parameter P of the target image according to $S_i$ and $S_{min}$.

With reference to the first possible implementation manner, in a second possible implementation manner, the determining the resolution parameter P of the target image according to $S_i$ and $S_{min}$ includes determining the resolution parameter P of the target image according to a ratio $S_i/S_{min}$ of $S_i$ to $S_{min}$.

With reference to the first aspect, in a third possible implementation manner, the obtaining extraction resolution $S_1$ according to the original image resolution $S_0$ and the resolution parameter P includes acquiring the extraction resolution $S_1$ according to a ratio $S_0/P$ of the original image resolution $S_0$ of the $T^{th}$ frame to the resolution parameter P of the $T^{th}$ frame.

With reference to the first aspect, in a fourth possible implementation manner, the obtaining extraction resolution $S_1$ according to the original image resolution $S_0$ and the resolution parameter P includes acquiring a resolution adjustment parameter $P_k$ for adjusting the extraction resolution $S_1$, and using a product $P_k*S_1$ of the resolution adjustment parameter $P_k$ and the extraction resolution $S_1$ as adjusted extraction resolution $S_2$.

With reference to the fourth possible implementation manner, in a fifth possible implementation manner, the acquiring a resolution adjustment parameter $P_k$ for adjusting the extraction resolution $S_1$ includes determining, in the $T^{th}$ frame, a quantity $T_a$ of feature points corresponding to the identified target object, where the feature points are pixels having predetermined grayscale values in the $T^{th}$ frame, performing image analysis processing on the $T^{th}$ frame at least one once, and obtaining a total quantity of pixels included in an image corresponding to the identified target object each time after image analysis processing is performed, and determining a minimum total pixel quantity $T_{min}$ among total pixel quantities that are separately obtained after image analysis processing is performed, and determining a ratio $T_a/T_{min}$ of the feature point quantity $T_a$ to the minimum total pixel quantity $T_{min}$ as the resolution adjustment parameter $P_k$.

A second aspect of the embodiments of the present disclosure provides an apparatus for extracting an image from a video, including an acquiring module configured to acquire a target image corresponding to a target object in the $T^{th}$ frame, and acquire original image resolution $S_0$ of the $T^{th}$ frame, where T is a positive integer, a determining module configured to determine a resolution parameter P of the target image, a processing module configured to obtain extraction resolution $S_1$ according to the original image resolution $S_0$ and the resolution parameter P, and an extraction module configured to extract an image of the target object in the $(T+1)^{th}$ frame according to the extraction resolution $S_1$.

With reference to the second aspect, in a first possible implementation manner, the determining module is further configured to acquire a quantity $S_i$ of pixels included in the target image, when image processing is performed on the $T^{th}$ frame, acquire a quantity of pixels included in an image corresponding to the target object after each of N times of image processing, and determine a minimum pixel quantity $S_{min}$ among all pixel quantities, and determine the resolution parameter P of the target image according to $S_i$ and $S_{min}$, where N is a positive integer.

With reference to the second aspect, in a second possible implementation manner, the extraction module is further configured to acquire a resolution adjustment parameter $P_k$ for adjusting the extraction resolution $S_1$, and use a product $P_k*S_1$ of the resolution adjustment parameter $P_k$ and the extraction resolution $S_1$ as adjusted extraction resolution $S_2$.

A third aspect of the embodiments of the present disclosure provides an image extraction device, including a communications interface configured to receive the $T^{th}$ frame and the $(T+1)^{th}$ frame, and a processor configured to acquire a target image corresponding to a target object in the $T^{th}$ frame, acquire original image resolution $S_0$ of the $T^{th}$ frame, determine a resolution parameter P of the target image, obtain extraction resolution $S_1$ according to the original image resolution $S_0$ and the resolution parameter P, and extract an image of the target object in the $(T+1)^{th}$ frame according to the extraction resolution $S_1$, where T is a positive integer.

With reference to the third aspect, in a first possible implementation manner, the processor is further configured to acquire a quantity $S_i$ of pixels included in the target image, when image processing is performed on the $T^{th}$ frame, acquire a quantity of pixels included in an image corresponding to the target object after each of N times of image processing, and determine a minimum pixel quantity $S_{min}$ among all pixel quantities, and determine the resolution parameter P of the target image according to $S_i$ and $S_{min}$, where N is a positive integer.

With reference to the third aspect, in a first possible implementation manner, the processor is further configured to acquire a resolution adjustment parameter $P_k$ for adjusting the extraction resolution $S_1$, and use a product $P_k*S_1$ of the resolution adjustment parameter $P_k$ and the extraction resolution $S_1$ as adjusted extraction resolution $S_2$.

In the embodiments of the present disclosure, before extraction processing is performed on a target object in the $(T+1)^{th}$ frame, original image resolution $S_0$ of the $T^{th}$ frame in which a target image corresponding to the target object is located is acquired, where T is a positive integer, a resolution parameter P of the target image in the $T^{th}$ frame is acquired, extraction resolution $S_1$ is obtained according to the original image resolution $S_0$ and the resolution parameter P, and an image of the target object in the $(T+1)$ frame is extracted according to the extraction resolution $S_1$. In this way, when extraction processing is performed on the target object of the $(T+1)^{th}$ frame, extraction processing is performed on the target image corresponding to the target object in the $(T+1)^{th}$ frame with reference to the extraction resolution, which is obtained through analysis, of the $(T+1)^{th}$ frame. Therefore, during a video extraction process, image extraction is performed on each frame using proper extraction resolution, which can improve the real-time quality, accuracy, and precision of video extraction.

In the embodiments of the present disclosure, after the extraction resolution $S_1$ for extracting the target image corresponding to the target object in the $(T+1)^{th}$ frame is obtained according to the original image resolution $S_0$ of the $T^{th}$ frame and the resolution parameter P of the target object in the $T^{th}$ frame, a resolution adjustment parameter $P_k$ for adjusting the extraction resolution in real time is further introduced, to properly adjust the extraction resolution in a process in which each frame is processed. In this way, a processing speed of image extraction in a high-resolution system is accelerated, and a problem that relatively much interference information exists when image extraction processing is performed by directly using original image resolution can be avoided using the resolution adjustment parameter $P_k$. Therefore, accuracy of image extraction is effectively improved.

DESCRIPTION OF EMBODIMENTS

Embodiments of the present disclosure provide a method and a device for extracting an image from a video. The method includes determining original image resolution $S_0$ of the $T^{th}$ frame in which a target image corresponding to a target object is located, acquiring a resolution parameter P of the target image in the $T^{th}$ frame. Then obtaining extraction resolution $S_1$ according to the original image resolution $S_0$ and the resolution parameter P, and finally extracting an image of the target object from the $(T+1)^{th}$ frame according to the extraction resolution $S_1$. In this way, a multi-resolution video extraction manner is implemented, and an extraction speed and precision of image extraction are improved.

Solutions of the present application are described in detail with reference to accompanying drawings and specific embodiments. It should be understood that the embodiments of the present disclosure and specific technical features of the embodiments are merely intended to describe the technical solutions of the present application in detail, rather than to limit the technical solutions of the present application. The embodiments and the specific technical features of the embodiments can be combined if no conflict is caused.

Figure 1:
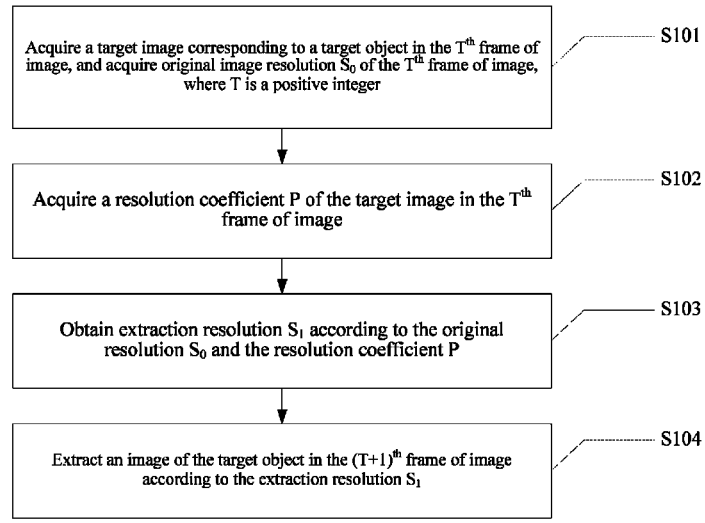
FIG. 1 is a flowchart of a method for extracting an image from a video according to an embodiment of the present disclosure.

As shown in FIG. 1, which is a flowchart of a video extraction method according to an embodiment of the present disclosure, the method includes the following steps.

Step S101: Acquire a target image corresponding to a target object in the $T^{th}$ frame, and acquire original image resolution $S_0$ of the $T^{th}$ frame, where T is a positive integer.

Step S102: Acquire a resolution parameter P of the target image in the $T^{th}$ frame.

Step S103: Obtain extraction resolution $S_1$ according to the original image resolution $S_0$ and the resolution parameter P.

Step S104: Extract an image of the target object in the $(T+1)^{th}$ frame according to the extraction resolution $S_1$.

First, before step S101, a target object for which video extraction is performed needs to be determined first. In this embodiment of the present disclosure, target objects may be numbered, and then a target object is determined according to numbers. That is, each target object has a sequence number, and a sequence number is determined in a video file such that a target object corresponding to the sequence number can be directly determined. Certainly, when a target object is determined, a feature type corresponding to the target object may also be determined. The feature type may be a feature type such as a person, a vehicle, and a building.

After a target object is determined, a target image corresponding to the target object is determined according to the target object, and then extraction processing is performed on the target image. A specific process is as follows.

First, original image resolution $S_0$ of the $T^{th}$ frame needs to be acquired when the $T^{th}$ frame is obtained. For example, the original image resolution $S_0=1000*1000$. An original quantity $S_i$ of pixels included in the target image in the $T^{th}$ frame is acquired before image analysis processing is performed. For example, the original pixel quantity herein may be 100*100 (that is, the target image consists of 100 horizontal pixels and 100 vertical pixels).

Then image analysis processing such as foreground extraction, target detection, and target tracking is performed on the $T^{th}$ frame. Then a quantity of pixels included in the target image in the $T^{th}$ frame is obtained after each of N times of image processing. For example, a quantity of pixels of the target image corresponding to the target object is 100*80 after foreground extraction is performed, and the pixel quantity is acquired; a quantity of pixels of the target image corresponding to the target object is 80*60 after target detection is performed, and in this case, the pixel quantity is acquired, and a quantity of pixels of the target image corresponding to the target object is 80*50 after target tracking is performed, and in this case, the pixel quantity is acquired.

A smallest pixel quantity among all pixel quantities that correspond to the target image and that are separately obtained after image analysis processing is performed is determined as a minimum pixel quantity $S_{min}$ of the target image in the $T^{th}$ frame. In addition, it should be noted that in this embodiment of the present disclosure, a minimum pixel quantity is selected, and certainly, in an actual processing process, a maximum pixel quantity may also be selected.

After the original pixel quantity $S_i$ and the minimum pixel quantity $S_{min}$ of the target image in the $T^{th}$ frame are obtained, a resolution parameter P of the target image in the $T^{th}$ frame is obtained according to the original pixel quantity $S_i$ and the minimum pixel quantity $S_{min}$.

The resolution parameter P of the target object in the $T^{th}$ frame may be acquired according to a ratio $S_i/S_{min}$ of $S_i$ to $S_{min}$, that is, $P=S_i/S_{min}$, but this embodiment of the present disclosure is not limited thereto. For example, the original pixel quantity $S_i$ of the target image in the $T^{th}$ frame is 100*100, and the minimum pixel quantity is 50*50. In this case, the resolution parameter $P=100*100/50*50=2*2$. It should be noted herein that because the minimum pixel quantity $S_{min}$ is a pixel quantity that is obtained through selection after image analysis processing is performed, if the smallest minimum resolution $S_{min}$ is directly selected, the resolution parameter P may be directly acquired, but if a quantity of pixels included in an image corresponding to the target object is reserved each time after image analysis processing is performed, there may be multiple resolution parameters P, that is, $P_a=100*100/100*80$, $P_b=100*100/80*60$, and $P_c=100*100/80*50$. In this case, a greatest resolution parameter may be selected among the multiple obtained resolution parameters P.

After the resolution parameter P of the target image in the $T^{th}$ frame is acquired, extraction resolution $S_1$ for extracting a target image corresponding to the target object in the $(T+1)^{th}$ frame is obtained according to the original image resolution $S_0$ of the $T^{th}$ frame and the resolution parameter P. The extraction resolution $S_1$ may be acquired according to a ratio $S_0/P$ of the original image resolution $S_0$ of the $T^{th}$ frame to the resolution parameter P, that is, $S_1=S_0/P$, but this embodiment of the present disclosure is not limited thereto. For example, the original image resolution is 1000*1000, and the resolution parameter $P=2*2$. In this case, the extraction resolution $S_1=1000*1000/2*2=500*500$. If obtained resolution parameters include P, $P_a$, $P_b$, and $P_c$, correspondingly, the extraction resolutions should include $S_a=S_0/P_a$, $S_b=S_0/P_b$, and $S_c=S_0/P_c$. In this case, greatest extraction resolution among $S_1$, $S_a$, $S_b$, and $S_c$ needs to be determined.

After the extraction resolution $S_1$ of the target object in the (T+1) frame is obtained, an image of the target object in the (T+1) frame is extracted according to the extraction resolution $S_1$.

Further, in this embodiment of the present disclosure, to improve accuracy of the extraction resolution $S_1$, after the extraction resolution $S_1$ is acquired in this embodiment of the present disclosure, a resolution adjustment parameter $P_k$ used to adjust the extraction resolution $S_1$ needs to be obtained, and adjusted extraction resolution $S_2$ is acquired according to the obtained resolution adjustment parameter $P_k$. Finally, extraction processing is performed, according to the adjusted extraction resolution $S_2$, on the target image corresponding to the target object in the $(T+1)^{th}$ frame.

Further, the foregoing resolution adjustment parameter $P_k$ may be acquired in the following manner:

Before image processing is performed on the $T^{th}$ frame, a quantity $T_a$ of feature points corresponding to the identified target object is determined in the $T^{th}$ frame, where the feature points may be pixels having predetermined grayscale values in the $T^{th}$ frame, that is, pixels whose grayscale values exceed a predetermined value, or certainly may be pixels having predetermined colors or pixels at luminance turning points or the like.

After image analysis processing is performed on the $T^{th}$ frame at least once, a total quantity of pixels included in an image corresponding to the identified target object is obtained each time after image analysis processing is performed. Because features of some pixels change in an image analysis processing process, the quantity, which is obtained each time after image analysis processing is performed, of pixels of the identified the target object is less than the quantity of feature points.

For example, a circular object is included in the $T^{th}$ frame, and if the circular object needs to be identified in the $T^{th}$ frame, pixels having predetermined grayscale values, that is, feature points, need to be determined. A quantity of feature points herein is 100. Features of pixels change in a process in which the $T^{th}$ frame is processed. In this case, a total quantity of pixels included in the identified circular object needs to be acquired each time after image processing is performed. For example, the circular object can be determined by determining 80 or 50 feature points around a center of a circle. In this case, the 50 may be determined as a minimum total pixel quantity $T_{min}$. Certainly, this is merely one implementation manner, and other manners that can achieve the effect are also included in the scope of this embodiment of the present disclosure.

Then a minimum total pixel quantity $T_{min}$ among total pixel quantities, which are separately obtained after image analysis processing is performed, of images corresponding to the target object is determined.

The resolution adjustment parameter $P_k$ is acquired according to the feature point quantity $T_a$ and the minimum total pixel quantity $T_{min}$. Furthermore, the resolution adjustment parameter $P_k$ may be acquired according to a ratio $T_a/T_{min}$ of the feature point quantity $T_a$ to the minimum total pixel quantity $T_{min}$, that is, $P_k=T_a/T_{min}$, but this embodiment of the present disclosure is not limited thereto.

After the resolution adjustment parameter $P_k$ is obtained, a product $P_k*S_1$ of the resolution adjustment parameter $P_k$ and the extraction resolution $S_1$ is used as adjusted extraction resolution $S_2$, and the adjusted extraction resolution $S_2$ is used as the final resolution for performing extraction processing on an image corresponding to the target object in the $(T+1)^{th}$ frame. Certainly, the product of $P_k$ and $S_1$ is merely one calculation manner of this embodiment of the present disclosure. Certainly, other calculation manners or other forms used by a person skilled in the art to achieve the foregoing effect shall all fall within the scope included in this embodiment of the present disclosure.

Extraction resolution of an image corresponding to the target object in each frame can be properly adjusted by introducing the resolution adjustment parameter $P_k$. In this way, a processing speed of image extraction in a high-resolution system is accelerated, and a problem that relatively much interference information exists when image extraction processing is performed by directly using original image resolution can be avoided using the resolution adjustment parameter $P_k$. Therefore, accuracy of image extraction is effectively improved.

It should be noted that T is a positive integer greater than 1, that is, a process in which the target object is processed in a source video file is a cyclical process. That is, for an image extraction process, processing is performed in order from the first frame, the second frame, the third frame to the last frame according to the process in the foregoing embodiment, and the processing process for extracting images corresponding to the target object ends when processing of all frames of images corresponding to the target object in the source video file is completed. In addition, in this embodiment of the present disclosure, extraction processing may be performed on multiple target objects simultaneously.

In addition, in this embodiment of the present disclosure, to make an image obtained after the image extraction processing process more convenient for a user to look up and browse, in this embodiment of the present disclosure, either of the determined original image resolution $S_0$ and the extraction resolution $S_1$ may be determined as target resolution $S_m$, and then extraction processing is performed, according to the target resolution $S_m$, on the target image corresponding to the target object in the $(T+1)^{th}$ frame. Certainly, either of the original image resolution $S_0$ and adjusted extraction resolution $S_2$ may alternatively be determined as extraction resolution, to perform extraction processing on the target image corresponding to the target object in the $(T+1)^{th}$ frame. In this way, optimal extraction resolution may be selected according to a user requirement and data storage space on condition that the extraction resolution is not greater than the original image resolution. In this way, not only a requirement of a user on extraction resolution is met, but also utilization of data storage space is improved.

Further, when extraction processing is performed on the target object in the $(T+1)^{th}$ frame, a target number, location information, trace information, and the like corresponding to the target object also need to be determined in the $(T+1)^{th}$ frame, and then extraction processing is performed, according to the target number, the location information, the trace information, and the extraction resolution $S_1$, on the target image corresponding to the target object in the $(T+1)^{th}$ frame. In this way, related information such as the target image, the target number, the location information, the trace information, a resolution value, and a display sequence of the target object in the source video file may be reserved in a stored extracted video, to facilitate subsequent lookup and browsing of a user.

In addition, it should be further noted that in this embodiment of the present disclosure, extraction processing may be centrally performed after extraction resolution of a target image corresponding to the target object in each frame is acquired, or extraction processing may be directly performed on a target image corresponding to the target object in a next frame each time after extraction resolution is acquired. That is, target image extraction processing may be completed frame by frame, or extraction processing may be performed centrally after resolution analysis is performed.

Figure 2:
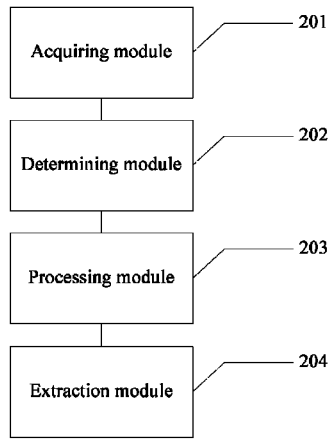
FIG. 2 is a schematic structural diagram of an apparatus for extracting an image from a video according to an embodiment of the present disclosure.

Corresponding to a method for extracting an image from a video in the embodiment among the embodiments of the present disclosure, an apparatus for extracting an image from a video is further provided in an embodiment of the present disclosure. As shown in FIG. 2, which is a schematic structural diagram of an apparatus for extracting an image from a video according to an embodiment of the present disclosure, the apparatus includes an acquiring module 201 configured to acquire a target image corresponding to a target object in the $T^{th}$ frame, and acquire original image resolution $S_0$ of the $T^{th}$ frame, where T is a positive integer, a determining module 202 configured to determine a resolution parameter P of the target image, a processing module 203 configured to obtain extraction resolution $S_1$ according to the original image resolution $S_0$ and the resolution parameter P, and an extraction module 204 configured to extract an image of the target object in the $(T+1)^{th}$ frame according to the extraction resolution $S_1$.

The determining module 202 is further configured to acquire a quantity $S_i$ of pixels included in the target image, when image processing is performed on the $T^{th}$ frame, acquire a quantity of pixels included in an image corresponding to the target object after each of N times of image processing, and determine a minimum pixel quantity $S_{min}$ among all pixel quantities, and determine the resolution parameter P of the target image according to $S_i$ and $S_{min}$, where N is a positive integer.

The extraction module 204 is further configured to acquire a resolution adjustment parameter $P_k$ for adjusting the extraction resolution $S_1$, and use a product $P_k*S_1$ of the resolution adjustment parameter $P_k$ and the extraction resolution $S_1$ as adjusted extraction resolution $S_2$.

Figure 3:
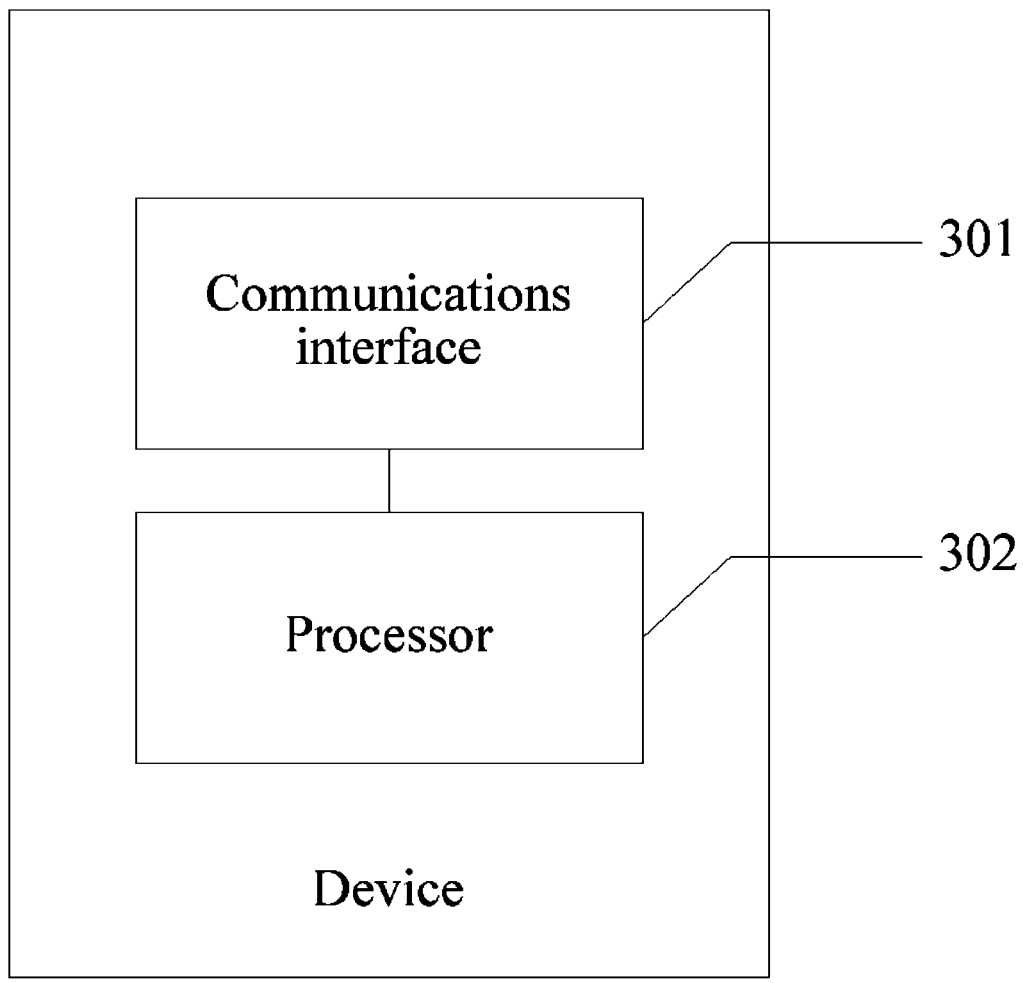
FIG. 3 is a schematic structural diagram of a device for extracting an image from a video according to an embodiment of the present disclosure.

Corresponding to a method for extracting an image from a video in the embodiment among the embodiments of the present disclosure, a device for extracting an image from a video is further provided in an embodiment of the present disclosure. As shown in FIG. 3, which is a schematic structural diagram of a device for extracting an image from a video according to an embodiment of the present disclosure, the device includes a communications interface 301 configured to receive the $T^{th}$ frame and the $(T+1)^{th}$ frame, and a processor 302 configured to acquire a target image corresponding to a target object in the $T^{th}$ frame, acquire original image resolution $S_0$ of the $T^{th}$ frame, determine a resolution parameter P of the target image, obtain extraction resolution $S_1$ according to the original image resolution $S_0$ and the resolution parameter P, and extract an image of the target object in the $(T+1)^{th}$ frame according to the extraction resolution $S_1$, where T is a positive integer.

The processor 302 is further configured to acquire a quantity $S_i$ of pixels included in the target image, when image processing is performed on the $T^{th}$ frame, acquire a quantity of pixels included in an image corresponding to the target object after each of N times of image processing, and determine a minimum pixel quantity $S_{min}$ among all pixel quantities, and determine the resolution parameter P of the target image according to $S_i$ and $S_{min}$, where N is a positive integer.

The processor 302 is further configured to acquire a resolution adjustment parameter $P_k$ for adjusting the extraction resolution $S_1$, and use a product $P_k*S_1$ of the resolution adjustment parameter $P_k$ and the extraction resolution $S_1$ as adjusted extraction resolution $S_2$.

One or more of the foregoing embodiments have at least the following technical effects or advantages.

In the embodiments of the present disclosure, before extraction processing is performed on a target object in the $(T+1)^{th}$ frame, original image resolution $S_0$ of the $T^{th}$ frame in which a target image corresponding to the target object is located is acquired, where T is a positive integer, a resolution parameter P of the target image in the $T^{th}$ frame is acquired, extraction resolution $S_1$ is obtained according to the original image resolution $S_0$ and the resolution parameter P, and an image of the target object in the (T+1) frame is extracted according to the extraction resolution $S_1$. In this way, when extraction processing is performed on the target object of the $(T+1)^{th}$ frame, extraction processing is performed on the target image corresponding to the target object in the $(T+1)^{th}$ frame with reference to the extraction resolution, which is obtained through analysis, of the $(T+1)^{th}$ frame. Therefore, during a video extraction process, image extraction is performed on each frame using proper extraction resolution, which can improve the real-time quality, accuracy, and precision of video extraction.

In the embodiments of the present disclosure, after the extraction resolution S1 for extracting the target image corresponding to the target object in the $(T+1)^{th}$ frame is obtained according to the original image resolution $S_0$ of the $T^{th}$ frame and the resolution parameter P of the target object in the $T^{th}$ frame, a resolution adjustment parameter $P_k$ for adjusting the extraction resolution in real time is further introduced, to properly adjust the extraction resolution in a process in which each frame is processed. In this way, a processing speed of image extraction in a high-resolution system is accelerated, and a problem that relatively much interference information exists when image extraction processing is performed by directly using original image resolution can be avoided using the resolution adjustment parameter $P_k$. Therefore, accuracy of image extraction is effectively improved.

In the embodiments of the present disclosure, either of the determined original image resolution $S_0$ and the extraction resolution $S_1$ may be determined as a target resolution $S_m$, and then extraction processing is performed, according to the target resolution $S_m$, on the target image corresponding to the target object in the $(T+1)^{th}$ frame. Certainly, either of the original image resolution $S_0$ and adjusted extraction resolution $S_2$ may also be determined as extraction resolution, to perform extraction processing on the target image corresponding to the target object in the $(T+1)^{th}$ frame. In this way, optimal extraction resolution may be selected according to a user requirement and data storage space on condition that the extraction resolution is not greater than the original image resolution. In this way, not only a requirement of a user on extraction resolution is met, but also utilization of data storage space is improved.

The present application is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present application.

A person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A method for extracting an image from a video, comprising:
   acquiring a target image corresponding to a target object in a $T^{th}$ frame;
   acquiring original image resolution $S_0$ of the $T^{th}$ frame, wherein T is a positive integer;
   performing at least one image analysis processing on the $T^{th}$ frame, wherein the image analysis processing comprises foreground extraction, target detection, and target tracking;
   determining a resolution parameter P of the target image, wherein the resolution parameter P is a ratio of an original quantity $S_i$ of pixels in the target image to a quantity of pixels in the target image after the at least one image analysis processing has been performed on the $T^{th}$ frame;
   obtaining an extraction resolution $S_1$ according to the original image resolution $S_0$ and the resolution parameter P; and
   extracting an image of the target object in a $(T+1)^{th}$ frame according to the extraction resolution $S_1$, wherein determining the resolution parameter P of the target image comprises acquiring the original quantity $S_i$ of pixels in the target image, and wherein performing at least one image analysis processing on the $T^{th}$ frame comprises:
   performing foreground extraction on the $T^{th}$ frame;
   acquiring a post-foreground extraction quantity of pixels in the target image after performing foreground extraction on $T^{th}$ frame;
   performing target detection on the $T^{th}$ frame;
   acquiring a post-target detection quantity of pixels in the target image after performing target detection on $T^{th}$ frame;
   performing target tracking on the $T^{th}$ frame;
   acquiring a post-target tracking quantity of pixels in the target image after performing target tracking on $T^{th}$ frame;
   determining a minimum pixel quantity $S_{min}$ among the post-foreground extraction quantity of pixels, post-target detection quantity of pixels, and post-target tracking quantity of pixels; and
   determining the resolution parameter P of the target image according to the original quantity $S_i$ and the minimum pixel quantity $S_{min}$.

2. The method according to claim 1, wherein determining the resolution parameter P of the target image according to the original quantity $S_i$ and the minimum pixel quantity $S_{min}$ comprises determining the resolution parameter P of the target image according to a ratio the original quantity $S_i$/the minimum pixel quantity $S_{min}$ of the original quantity $S_i$ and the minimum pixel quantity $S_{min}$.

3. The method according to claim 1, wherein obtaining the extraction resolution $S_1$ according to the original image resolution $S_0$ and the resolution parameter P comprises acquiring the extraction resolution $S_1$ according to a ratio original image resolution $S_0$/resolution parameter P of the original image resolution $S_0$ of the $T^{th}$ frame and the resolution parameter P of the $T^{th}$ frame.

4. The method according to claim 1, wherein obtaining the extraction resolution $S_1$ according to the original image resolution $S_0$ and the resolution parameter P comprises:
   acquiring a resolution adjustment parameter $P_k$ for adjusting the extraction resolution $S_1$; and
   using a product $P_k * S_1$ of the resolution adjustment parameter $P_k$ and the extraction resolution $S_1$ as adjusted extraction resolution $S_2$.

5. The method according to claim 4,
   wherein acquiring the resolution adjustment parameter $P_k$ for adjusting the extraction resolution $S_1$ comprises:
   determining, in the $T^{th}$ frame, a quantity $T_a$ of feature points corresponding to the identified target object, wherein the feature points are pixels having predetermined grayscale values in the $T^{th}$ frame;
   determining a minimum total pixel quantity $T_{min}$ among a post-foreground extraction total quantity of pixels, a post-target detection total quantity of pixels, and a post-target tracking total quantity of pixels; and
   determining a ratio of the quantity $T_a$/minimum total pixel quantity $T_{min}$ of the feature point quantity $T_a$ and the minimum pixel quantity $T_{min}$ as the resolution adjustment parameter $P_k$.

6. An apparatus for extracting an image from a video, comprising:
   a processor; and
   a non-transitory computer-readable storage medium coupled to the processor and storing programming instructions for execution by the processor, wherein the instructions instruct the processor to:
   acquire a target image corresponding to a target object in a $T^{th}$ frame;
   acquire original image resolution $S_0$ of the $T^{th}$ frame, wherein T is a positive integer;
   perform at least one image analysis processing on the $T^{th}$ frame, wherein the image analysis processing comprises foreground extraction, target detection, and target tracking;
   determine a resolution parameter P of the target image, wherein the resolution parameter P is a ratio of an original quantity $S_i$ of pixels in the target image to a quantity of pixels in the target image after the at least one image analysis processing has been performed on the $T^{th}$ frame;
   obtain an extraction resolution $S_1$ according to the original image resolution $S_0$ and the resolution parameter P;
   extract an image of the target object in a $(T+1)^{th}$ frame according to the extraction resolution $S_1$;
   perform foreground extraction on the $T^{th}$ frame;
   acquire a post-foreground extraction quantity of pixels in the target image after performing foreground extraction on $T^{th}$ frame;
   perform target detection on the $T^{th}$ frame;
   acquire a post-target detection quantity of pixels in the target image after performing target detection on $T^{th}$ frame;
   perform target tracking on the $T^{th}$ frame; and
   acquire a post-target tracking quantity of pixels in the target image after performing target tracking on $T^{th}$ frame.

7. The apparatus according to claim 6, wherein the instructions further instruct the processor to:
   determine a minimum pixel quantity $S_{min}$ among the post-foreground extraction quantity of pixels, post-target detection quantity of pixels, and post-target tracking quantity of pixels; and determine the resolution parameter P of the target image according to the original quantity $S_i$ and the minimum pixel quantity $S_{min}$, and wherein N is a positive integer.

8. The apparatus according to claim 6, wherein the instructions further instruct the processor to:

acquire a resolution adjustment parameter $P_k$ for adjusting the extraction resolution $S_1$; and use a product $P_k*S_1$ of the resolution adjustment parameter $P_k$ and the extraction resolution $S_1$ as adjusted extraction resolution $S_2$.

9. An image extraction device, comprising:

a communications interface configured to receive a $T^{th}$ frame and a $(T+1)^{th}$ frame; and a processor coupled to the communications interface and configured to:

acquire a target image corresponding to a target object in the $T^{th}$ frame;

acquire original image resolution $S_0$ of the $T^{th}$ frame;

perform at least one image analysis processing on the $T^{th}$ frame, wherein the image analysis processing comprises foreground extraction, target detection, and target tracking;

determine a resolution parameter P of the target image, wherein the resolution parameter P is a ratio of an original quantity $S_i$ of pixels in the target image to a quantity of pixels in the target image after the at least one image analysis processing has been performed on the $T^{th}$ frame;

obtain an extraction resolution $S_1$ according to the original image resolution $S_0$ and the resolution parameter P; and extract an image of the target object in the $(T+1)^{th}$ frame according to the extraction resolution $S_1$, and wherein T is a positive integer;

perform foreground extraction on the $T^{th}$ frame;

acquire a post-foreground extraction quantity of pixels in the target image after performing foreground extraction on $T^{th}$ frame;

perform target detection on the $T^{th}$ frame;

acquire a post-target detection quantity of pixels in the target image after performing target detection on $T^{th}$ frame;

perform target tracking on the $T^{th}$ frame; and acquire a post-target tracking quantity of pixels in the target image after performing target tracking on $T^{th}$ frame.

10. The device according to claim 9, wherein the processor is further configured to:

determine a minimum pixel quantity $S_{min}$ among the post-foreground extraction quantity of pixels, post-target detection quantity of pixels, and post-target tracking quantity of pixels; and determine the resolution parameter P of the target image according to the original quantity $S_i$ and the minimum pixel quantity $S_{min}$, wherein N is a positive integer.

11. The device according to claim 9, wherein the processor is further configured to:

acquire a resolution adjustment parameter $P_k$ for adjusting the extraction resolution $S_1$; and use a product $P_k*S_1$ of the resolution adjustment parameter $P_k$ and the extraction resolution $S_1$ as adjusted extraction resolution $S_2$.

12. The apparatus according to claim 7, wherein the instructions further instruct the processor to determine the resolution parameter P of the target image according to a ratio the original quantity $S_i$/the minimum pixel quantity $S_{min}$ of the original quantity $S_i$ and the minimum pixel quantity $S_{min}$.

13. The apparatus according to claim 6, wherein the instructions further instruct the processor to acquire the extraction resolution $S_1$ according to a ratio original image resolution $S_0$/resolution parameter P of the original image resolution $S_0$ of the $T^{th}$ frame and the resolution parameter P of the $T^{th}$ frame.

14. The apparatus according to claim 6 wherein the instructions further instruct the processor to:

determine, in the $T^{th}$ frame, a quantity $T_a$ of feature points corresponding to the identified target object, wherein the feature points are pixels having predetermined grayscale values in the $T^{th}$ frame; and determine a minimum total pixel quantity $T_{min}$ among a post-foreground extraction total quantity of pixels, a post-target detection total quantity of pixels, and a post-target tracking total quantity of pixels; and determine a ratio of the quantity $T_a$/minimum total pixel quantity $T_{min}$ of the feature point quantity $T_a$ and the minimum pixel quantity $T_{min}$ as the resolution adjustment parameter $P_k$.

15. The device according to claim 10, wherein the processor is further configured to determine the resolution parameter P of the target image according to a ratio the original quantity $S_i$/the minimum pixel quantity $S_{min}$ of the original quantity $S_i$ and the minimum pixel quantity $S_{min}$.

16. The device according to claim 9, wherein the processor is further configured to acquire the extraction resolution $S_1$ according to a ratio original image resolution $S_0$/resolution parameter P of the original image resolution $S_0$ of the $T^{th}$ frame and the resolution parameter P of the $T^{th}$ frame.

17. The device according to claim 9, wherein the processor is further configured to perform foreground extraction, target detection, and target tracking on the $T^{th}$ frame.

* * * * *